Patented June 13, 1944

2,351,108

UNITED STATES PATENT OFFICE 2,351,108

MERCAPTAN MODIFIED POLYMERIC DERIVATIVES OF NONBENZENOID ACETYLENE POLYMERS AND PROCESS FOR MAKING SAME

Arnold M. Collins, Wilmington, Del., assignor to E. I. du Pont de Nemours & Company, Wilmington, Del., a corporation of Delaware No Drawing. Application July 31, 1940,
Serial No. 348,975

10 Claims. (Cl. 260—79)

This invention relates to the art of film-forming, liquid materials and the process of making them. More particularly, it relates to synthetic drying oils which are polymeric derivatives of non-benzenoid acetylene polymers containing mercaptans in chemical combination.

In U. S. Patent No. 1,812,849 is disclosed a method for making liquid, non-volatile interpolymers by heating divinylacetylene and related unsaturated hydrocarbons for a time insufficient to cause gelation and thereafter removing the unpolymerized portion of the hydrocarbons. These liquid polymers dry rapidly on exposure to air with the formation of very hard films which have extraordinary resistance to the action of chemicals and solvents. This process for making the polymers has the disadvantage, however, that the yields of the liquid soluble products are low, and, if more complete polymerization is brought about, the product is an insoluble gel or solid rather than a soluble liquid. The yields of soluble products may be somewhat improved by the substitution of part or all of the divinylacetylene by a tetramer of acetylene believed to be a butadienyl vinylacetylene or by the addition of solvents or amines or by the exclusion of oxygen according to the above-identified patent or by the addition of small proportions of iodine as in U. S. Patent 2,055,597. There is, however, no completely satisfactory and generally applicable method for producing these polymers in one operation in satisfactory yields. Moreover, the films formed from the liquid polymers are, in spite of their remarkable properties, subject to the disadvantages that they are brittle, do not adhere well to smooth surfaces, and sometimes pass through a stage during drying at which they ignite when struck a sharp blow with a hammer. The adhesion may be improved by the additon of suitable pigments in certain amounts as in U. S. Patent No. 2,008,746. The brittleness may be reduced by polymerizing the divinylacetylene in the presence of certain more flexible film-forming materials, for example alkyd resins modified with drying oils, as in U. S. Patent No. 2,078,194. In general, however, the addition of softening, flexibilizing and plasticizing agents to the polymer causes no permanent improvement in the properties of the film, since such materials are incompatible with the dried films and, thus, form a separate phase which does not much alter the properties of the film as a whole. A film-forming material of improved adhesion may be prepared by the addition of hydrogen polysulfide to the divinylacetylene as in U. S. Patent No. 2,061,018 or by the addition of a mixture of hydrogen sulfide and sulfur as in U. S. Patent No. 2,061,019. In spite of the improvement obtained along these various lines, however, no product has been developed which is free from the disadvantages of the divinylacetylene polymers discussed above.

It is an object of this invention to provide new film-forming materials. Another object is to produce new synthetic drying oils from non-benzenoid polymers of acetylene which are insensitive to shock during drying and which have improved adhesion to smooth surfaces. Other objects will appear hereinafter.

These objects have been accomplished by the discovery that a new type of film-forming material having the desired characteristics is produced by polymerizing non-benzenoid polymers of acetylene in the presence of mercaptans.

In order that the invention may be more fully understood the following specific examples are given to illustrate without in any way limiting the invention. Parts by weight are used throughout. In each of the following examples, 100 parts of divinylacetylene containing a substantial proportion of acetylene tetramer and the indicated quantity of mercaptan were heated at 80° C. for the time indicated, in closed containers containing a small volume of air. The fluid reaction products were then heated up to 100° C. at 20 mm. pressure to remove the unchanged hydrocarbons by distillation. In Example I, the unchanged xylyl mercaptan was also removed by shaking the reaction product with several portions of a 25 per cent solution of sodium hydroxide in water before the removal of the unchanged hydrocarbons. The final product in each case was a moderately viscous yellow or light brown oil, non-volatile at 150° C., soluble in organic solvents such as acetone, ethyl acetate, and benzene and having the drying properties to be discussed below.

TABLE

*Polymerization of divinylacetylene in the presence of mercaptans*

| Example No. | Mercaptans | Parts per 100 parts divinylacetylene | Time | Yield |
|---|---|---|---|---|
| | | | Hours | Per cent |
| 1 | Xylyl mercaptan | 35 | 16 | 81 |
| 2 | Xylyl mercaptan | 9 | 24 | 60 |
| 3 | Benzyl mercaptan | 32 | 16 | 72 |
| 4 | n-Octyl mercaptan | 37 | 16 | 67 |

The xylyl mercaptan used was a mixture of isomers obtained by sulfonating ordinary xylene and reducing.

The hydrocarbon which is polymerized to form the synthetic drying oil may be any of the non-benzenoid polymerizable polymers of acetylene such as monovinylacetylene, divinylacetylene, the acetylenic isomer of divinylacetylene and the linear tetramer of acetylene or any mixtures of these such as the mixture produced by the polymerization of acetylene in the presence of a cuprous chloride catalyst. Such mixtures are preferred because of their ready availability and are used in the above examples. Divinylacetylene alone, however, gives similar results. Other materials may be added before or during polymerization. These may be solvents, film-forming materials, or polymerizable compounds such as chloroprene, butadiene, styrene, vinyl esters, vinyl ethers and vinyl ketones and unsaturated acids or their derivatives such as methyl methacrylate, acrylic nitrile and the glycerides of natural drying oil acids including the modified alkyd resins as well as the natural glycerides themselves.

The mercaptan used may be either aromatic, aliphatic or mixed, as illustrated in the examples. The mercaptan may also include more than 1 mercapto group and also other groups such as nitro, chloro, sulfo, carboxyl, and the like.

Examples of suitable mercaptans, in addition to those given above, are ethyl, butyl, cetyl, phenyl, nitro-phenyl, and naphthyl mercaptans. Certain other types of compounds which also have a pronounced tendency to add to double bonds behave like the mercaptans toward divinylacetylene etc. Thus, for example, heptane sulfinic acid, when used in place of the mercaptans in Example I, gave a good yield of a rapidly drying product.

The molecular ratio of mercaptan to acetylene polymer should be smaller than about 1:3 in order to give products having satisfactory ability to dry in thin films. A ratio between 1:20 and 1:5 is preferred, as in the examples.

A temperature of polymerization between 60° C. and 100° C. is usually preferred, although both lower temperatures and higher temperatures up to the decomposition point of the unsaturated hydrocarbon may be used.

The reaction may be accelerated by raising the temperature or by the use of catalysts, which include both the well-known polymerization catalysts such as organic and inorganic peroxides and per-compounds in general and the catalysts which are known to catalyze the addition of mercaptans to unsaturated compounds, such as organic amines. Light also catalyzes the reaction. The reaction may be carried out in an emulsion by dispersing the ingredients in an aqueous solution of a dispersing agent such as sodium abietate, the alkyl naphthylene sulfonates and the sulfates and sulfonates of long-chain alcohols. The polymerization may also be carried out advantageously as a continuous process by passing the ingredients through a suitable vessel such as a long tube at such a speed and at such a temperature that the material delivered at the end has reached the desired stage of combination and polymerization as described in U. S. Patent No. 1,950,429.

The product of this invention, prior to the utilization as film-forming materials, may be treated and compounded in any of the ways already described in connection with the polymers of divinylacetylene. Thus, the driers commonly used in the paint and varnish industry, such as the oil-soluble salts of cobalt, manganese, and lead may be added to accelerate the drying and hardening of the product of the present invention. Antioxidants may, on the other hand, be added to retard the drying. In this connection, volatile antioxidants, such as eugenol and similar phenols, are advantageous in that they retard the first part of the drying process (thus preventing the roughening of the surface which is associated with too rapid initial drying) but soon evaporate from the film and, thus, do not much retard its final hardening. Pigments and fillers may be incorporated by the usual methods with the object of either coloring the film, giving it hiding power, or improving its adhesion (see U. S. Patent No. 2,008,746) and other physical properties.

The products of this invention differ from polymers of divinylacetylene and the like made in the absence of mercaptans in being insensitive to shock during drying, in having improved adhesion to smooth surfaces, and in being capable of being permanently improved by the incorporation of other film-forming materials. Thus, drying oils and varnish bases may be successfully incorporated, but particularly useful ingredients are the plastic and soluble polymers of chloroprene, such as those made according to U. S. Patent No. 1,950,436 and copending U. S. applications 156,518 filed July 30, 1937, which has issued as U. S. Patent No. 2,227,517 and 264,581 filed March 28, 1939, which has issued as U. S. Patent No. 2,234,215. These are conveniently added dissolved in a mutual solvent, such as xylene. The incorporation of 10 per cent, for example, of the chloroprene polymer gives films which, even after having been thoroughly hardened and aged by baking, are much tougher and less brittle than the film containing no chloroprene polymer. They also show much better adhesion to smooth surfaces than the untreated material, which, in turn, adheres better than the polymers made without mercaptans.

It is apparent that many widely different embodiments of this invention may be made without departing from the spirit and scope thereof, and, therefore, it is not intended to be limited except as indicated in the appended claims.

I claim:
1. Process of making a film-forming material which comprises polymerizing for a time insufficient to cause gelation non-benzenoid polymers of acetylene having less than 9 carbon atoms in the presence of a mercaptan, the molecular ratio of mercaptan to acetylene polymers being less than 1/3.

2. Process of making a film-forming material which comprises polymerizing for a time insufficient to cause gelation non-benzenoid polymers of acetylene having less than 9 carbon atoms in the presence of a mercaptan, the molecular ratio of mercaptan to acetylene polymers being less than 1/3, and isolating a liquid product which is non-volatile at 150° C.

3. Process of making a film-forming material which comprises polymerizing divinylacetylene in the presence of a mercaptan, the molecular ratio of mercaptan to divinylacetylene being about from 1/20 to 1/5.

4. Process for making a film-forming material which comprises polymerizing divinylacetylene in the presence of a mercaptan, the molecular ratio of mercaptan to divinylacetylene being about from 1/20 to 1/5, and isolating a liquid product which is non-volatile at 150° C.

5. The process for making a film-forming material which comprises polymerizing divinylacetylene in the presence of n-octyl-mercaptan, the molecular ratio of mercaptan to divinylacetylene being about from 1/20 to 1/5, and isolating a liquid product which is non-volatile at 150° C.

6. The process for making a film-forming material which comprises polymerizing divinylacetylene in the presence of xylyl-mercaptan, the molecular ratio of mercaptan to divinylacetylene being about from 1/20 to 1/5, and isolating a liquid product which is non-volatile at 150° C.

7. The process for making a film-forming material which comprises polymerizing divinylacetylene in the presence of benzyl-mercaptan, the molecular ratio of mercaptan to divinylacetylene being about from 1/20 to 1/5, and isolating a liquid product which is non-volatile at 150° C.

8. A film-forming material comprising polymeric derivatives of non-benzenoid polymers of acetylene obtained by the process of claim 1.

9. A film-forming material comprising polymeric derivatives of divinylacetylene obtained by the process of claim 4.

10. A film-forming material comprising polymeric derivatives of divinylacetylene obtained by the process of claim 6.

ARNOLD M. COLLINS.